United States Patent Office 3,053,808
Patented Sept. 11, 1962

3,053,808
POLYMERIC POLYKETONES AND PROCESS FOR PREPARING SAME
Benjamin Wilson Howk, West Chester, Pa., assignor to E. I. du Pont de Nemours and Company, Wilmington, Del., a corporation of Delaware
No Drawing. Filed Aug. 14, 1959, Ser. No. 833,711
7 Claims. (Cl. 260—63)

This invention relates to new polymeric compositions and to their preparation.

U.S. Patent No. 2,757,146 to F. S. Fawcett is concerned with polyarylenemethylene and halogenopolyarylenemethylene homopolymers. These polymers are obtained by thermally decomposing quaternary ammonium hydroxides of the general formula

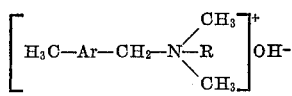

wherein Ar is arylene or haloarylene having its free valences in the para position and R is methyl or phenyl.

It has now been found that copolymers containing recurring carbonyl groups are obtained by passing a mixture of carbon monoxide and the volatile pyrolysis products of the above defined quaternary ammonium hydroxides into a reduced temperature zone.

This invention provides a new class of polymeric polyketones containing recurring intralinear carbonyl and $$-\overset{H}{\underset{H}{C}}-Ar-\overset{H}{\underset{H}{C}}-$$

groups, wherein Ar is arylene or haloarylene, e.g.,

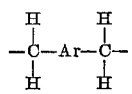

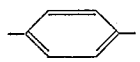

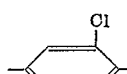

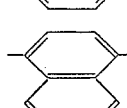

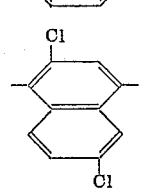

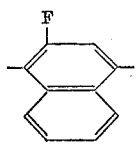

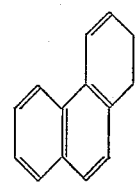

etc.

A convenient method for preparing the new polymeric polyketones of this invention is by heating a quaternary ammonium hydroxide of the above mentioned kind to a temperature above 45° C., mixing the volatile pyrolysis products with carbon monoxide, and continuously sweeping the mixture under reduced pressure into a collecting vessel maintained at 0° to −100° C. The desired copolymer forms in the cold vessel and is isolated therefrom by conventional means.

The examples which follow are merely illustrative and are not intended to limit this invention.

*Example I*

A 500-ml. flask equipped with a dropping funnel and gas inlet and outlet tubes was heated in an oil bath at 200° C. Attached to the outlet tube was an 18-inch heat-resistant glass tube heated in a sleeve at 200° C. and in turn connected to a solid carbon dioxide/acetone trap and a vacuum pump. After the flask had reached 200° C., the pressure was reduced to 40 mm., then adjusted to 80 mm. with a continuous stream of carbon monoxide entering the flask. With the pressure and temperature maintained at 80 mm. and 200° C., respectively, a solution of 4.7 g. of p-methylbenzyltrimethylammonium hydroxide in 40 ml. of water was added dropwise to the heated flask over a period of three hours. The friable polymer (0.12 g.) which formed in the top of the cold trap melted on a metal block at 190° C. to a clear melt under pressure, after softening at 70° C. Infrared absorption data indicated p-xylylene and carbonyl

groups. Analysis showed C, 88.23%; H, 7.43%; and $\eta_{inh.}=0.23$ at 0.06% in benzyl benzoate at 254° C. The C and H values correspond to an empirical formula of $C_{32}H_{32}O$, which is approximately a polymer containing 4 moles of xylylene per mole of carbon monoxide. A self-supporting film was compression-molded at 200° C. and 200 lbs. total pressure. The film thus obtained was homogeneous and translucent.

*Example II*

Example I was repeated, except that the 200° C. exit tube was omitted and the total pressure was 120 mm. with 60 mm. of this total pressure being attributed to the carbon monoxide. In the solid carbon dioxide/acetone trap there was formed 0.12 g. of p-xylylene/carbon monoxide copolymer. Analysis of the copolymer showed it to contain 90.18% C and 7.57% H. On the basis of this analysis the product corresponds to one containing a xylylene/CO mole ratio of 6:1. The inherent viscosity was 0.31, measured at 0.06% concentration in benzyl benzoate at 254° C. On a metal block, this polymer melted at 230° C. under slight pressure. It dissolved in benzyl benzoate at 270° C. but reprecipitated at 225° C. Translucent homogeneous self-supporting films were obtained by compression molding at 225° C. to 270° C. under 200 lb. total pressure.

Thirty-five milligrams of the polymer obtained as above was extracted with toluene for about two hours to give 23 mg. of solid, appearance similar to the starting material. Infrared absorption of the toluene-insoluble polymer was identical with that of the original which showed carbonyl and p-xylylene units. Direct oxygen analysis was equal to the original (by difference) within experimental error. This is shown below.

| Analysis | Percent C | Percent H | O | Empirical | Xylylene/CO |
|---|---|---|---|---|---|
| Original | 90.08 | 7.57 | 2.35 (by difference) | $C_{50}H_{50}O$ | 6:1 |
| Purified | | | 2.05 (direct) | $C_{58.8}H_{58.8}O$ | 7:1 |

The softening point of the purified polymer on a metal block was 246° C. in contrast to 230° C. for the unpurified polymer. The purified sample was soluble in benzyl benzoate at elevated temperatures and was compression-molded at 270° C. to give a homogeneous, translucent self-supporting film.

The detailed examples have employed a specific quaternary ammonium hydroxide. It is to be understood that in place thereof there can be used any quaternary ammonium hydroxide of general formula

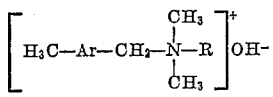

wherein Ar and R have the previously indicated meanings. Examples of such quaternary ammonium hydroxides are 2-fluoro-4-methylbenzyltrimethylammonium hydroxide, 3-iodo-4-methylbenzyltrimethylammonium hydroxide, (3-bromo-4-methyl-1-naphthylmethyl)trimethylammonium hydroxide, 3,5 - dichloro - 4 - methylbenzyltrimethylammonium hydroxide, (4-methyl-1-naphthylmethyl)dimethylphenylammonium hydroxide, (1 - methyl-4-phenanthrylmethyl)trimethylammonium hydroxide and the like. The methylene group attached to both the arylene nucleus and the quaternary ammonium hydroxide group is para positioned to the methyl group on the same arylene nucleus.

The preferred quaternary ammonium hydroxides are those in which the arylene nucleus is of one to two benzene nuclei and is either unsubstituted or substituted by at most one halogen, preferably of atomic number 9 to 17, i.e., fluorine or chlorine.

The copolymers of this invention are produced by thermally decomposing the quaternary ammonium hydroxide, admixing the pyrolysis products with carbon monoxide, and passing the mixture under reduced pressure into a low temperature zone held at 0° to −100° C. A satisfactory temperature range for effecting the pyrolysis of quaternary ammonium hydroxide reaction is 60° to 250° C.

Apparatus which is convenient for effecting the reaction is one which provides a pyrolysis chamber for the quaternary ammonium hydroxide and a suitable low temperature zone for the copolymerization of carbon monoxide and pyrolysis products. In practice the quaternary ammonium hydroxide is added slowly to the heated reactor in the presence of a continuous stream of carbon monoxide. The process is usually operated under reduced pressure to facilitate transfer of volatile reaction products to the low temperature polymerization zone.

At the end of the reaction, the product obtained can be purified by extraction with a suitable hot solvent such as toluene, or by other means known to those skilled in the art.

The novel polymers are high molecular weight polyketones containing recurring intralinear carbonyl,

and

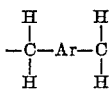

units in a molar ratio of 1:1 to 1:10, respectively, i.e., from equimolar up to a ratio of one mol of

to ten mols of the other unit. Ar represents an arylene or a haloarylene group, having its free valences in the para positions, preferably phenylene,

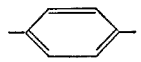

or naphthylene

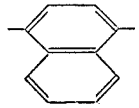

and the halogenated derivatives thereof, preferably those substituted by at most one halogen of atomic number 9 to 17.

By "high molecular weight" as the term is used herein is meant that the polymers are capable of forming self-supporting films and that they have an inherent viscosity of at least 0.2 measured in benzyl benzoate at 254° C. in a concentration of 0.06% by weight. The preferred polyketones consist essentially of the following recurring structural units

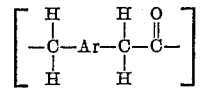

and mixtures thereof with up to 90 mol percent of

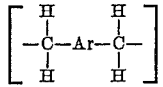

units wherein Ar has the meaning expressed above.

The polymers produced in accord with this invention yield translucent self-supporting films and those films find application as protective coatings.

The insolubility of the copolymers of this invention in most of the common organic solvents renders them particularly useful in applications where a high order of protection against the action of organic solvents is required, as in liners for reactors and the like. This use is illustrated below:

A strip of autobody steel was coated with a hot benzyl benzoate solution of p-xylylene/CO copolymer of Example I and solvent evaporated at 155°/2 mm. The coated strip was immersed in heptane three days and the coating was found to have remained intact, protecting the metal. A similarly coated strip, from which part of the coating had been scraped, was placed for three days on a platform above concentrated HCl in a beaker covered with a watch glass. The panel was then allowed to stand in the air for one day. The metal under the coating was still shiny; whereas the bare area had rusted with formation of an appreciable layer of yellow-brown powdery rust.

What is claimed is:

1. A method for making polyketones comprising pyrolyzing at a temperature above 45° C. a quaternary ammonium hydroxide of the formula

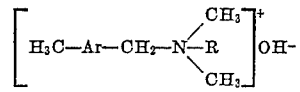

wherein R is selected from the group consisting of phenyl and methyl and Ar is an arylene group having free valences in the para position and being composed of 1–3 aromatic rings bearing a total of up to two substituents, said substituents being selected from the class consisting of halogen and the methyl group, admixing the volatile pyrolysis products with carbon monoxide, sweeping the mixture of pyrolysis products and carbon monoxide into a low temperature zone maintained at 0° to −100° C., and recovering from the low temperature zone the polyketone formed therein.

2. The process of claim 1 carried out at a temperature of from 60–250° C.

3. The method of claim 1 wherein the quaternary ammonium hydroxide is p-methylbenzyltrimethylammonium hydroxide.

4. A high molecular weight linear polyketone consisting essentially of recurring intralinear carbonyl and

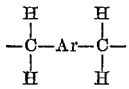

units in a molar ratio of 1:1 to 1:10, respectively, wherein Ar is an arylene group having free valences in the para position and being composed of 1–3 aromatic rings bearing a total of up to two substitutents, said substituents being selected from the class consisting of halogen and the methyl group.

5. The polymer of claim 4 wherein Ar represents

6. The polymer of claim 4 wherein Ar represents

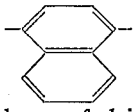

7. A film of the polymer of claim 4.

References Cited in the file of this patent

UNITED STATES PATENTS

| | | |
|---|---|---|
| 2,495,286 | Brubaker | Jan. 24, 1950 |
| 2,551,050 | Pinkston | May 1, 1951 |
| 2,757,146 | Fawcett | July 31, 1956 |
| 2,873,299 | Mikeska | Feb. 10, 1959 |
| 2,914,511 | Errede | Nov. 24, 1959 |